US012436750B2

(12) United States Patent
Mahjour et al.

(10) Patent No.: US 12,436,750 B2
(45) Date of Patent: Oct. 7, 2025

(54) SELECTING AN EPILOGUE VECTORIZATION FACTOR FOR USE IN COMPUTER PROCESSING

(71) Applicant: INTERNATIONAL BUSINESS MACHINES CORPORATION, Armonk, NY (US)

(72) Inventors: Bardia Mahjour, Newmarket (CA); Ettore Tiotto, Whitby (CA); Wai Hung Tsang, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 804 days.

(21) Appl. No.: 17/456,411

(22) Filed: Nov. 24, 2021

(65) Prior Publication Data
US 2023/0161573 A1    May 25, 2023

(51) Int. Cl.
*G06F 8/41*    (2018.01)

(52) U.S. Cl.
CPC ................... *G06F 8/4441* (2013.01)

(58) Field of Classification Search
CPC .................... G06F 8/4441; G06F 8/452
See application file for complete search history.

(56) References Cited

U.S. PATENT DOCUMENTS

| 7,395,531 | B2* | 7/2008 | Eichenberger | G06F 8/447 717/160 |
| 8,341,615 | B2 | 12/2012 | Eichenberger et al. | |
| 8,627,304 | B2* | 1/2014 | Nuzman | G06F 8/452 717/160 |
| 8,713,549 | B2* | 4/2014 | Nuzman | G06F 8/452 717/160 |
| 9,244,677 | B2* | 1/2016 | Vasudevan | G06F 8/452 |
| 10,180,829 | B2* | 1/2019 | Burlacu-Zane | G06F 8/4441 |
| 10,353,708 | B2* | 7/2019 | Rasale | G06F 15/8053 |
| 10,853,043 | B2* | 12/2020 | Caballero de Gea | G06F 8/447 |
| 11,442,713 | B2* | 9/2022 | Caballero de Gea | G06F 8/447 |
| 11,789,734 | B2* | 10/2023 | Rasale | G06F 9/30018 712/4 |

(Continued)

FOREIGN PATENT DOCUMENTS

| CN | 103279327 B | 11/2015 | |
| EP | 2680132 A2 * | 1/2014 | ............. G06F 8/452 |
| EP | 2680132 B1 * | 8/2018 | ........... G06F 8/4452 |

OTHER PUBLICATIONS

Caballero, Diego, et al. "Optimizing overlapped memory accesses in user-directed vectorization." Proceedings of the 29th ACM on International Conference on Supercomputing. 2015. (Year: 2015).*

(Continued)

*Primary Examiner* — Matthew J Brophy
(74) *Attorney, Agent, or Firm* — Eric Chesley, Esq.; Blanche E. Schiller, Esq.; Heslin Rothenberg Farley & Mesiti P.C.

(57) ABSTRACT

A vectorization factor to be used in vectorization of an epilogue loop in program code is automatically selected. The automatically selecting includes selecting the vectorization factor from a plurality of candidate vectorization factors based on one or more considerations relating to vectorizing the epilogue loop. The vectorization factor that is automatically selected is used in vectorizing the epilogue loop.

20 Claims, 7 Drawing Sheets

(56) References Cited

U.S. PATENT DOCUMENTS

| | | | |
|---|---|---|---|
| 2005/0283773 A1* | 12/2005 | Eichenberger | G06F 8/447 717/151 |
| 2008/0222623 A1* | 9/2008 | Eichenberger | G06F 8/447 717/160 |
| 2011/0029962 A1* | 2/2011 | Nuzman | G06F 8/452 717/160 |
| 2012/0331453 A1* | 12/2012 | Nuzman | G06F 8/452 717/160 |
| 2014/0237217 A1 | 8/2014 | Schmidt | |
| 2014/0237460 A1* | 8/2014 | Schmidt | G06F 9/3001 717/160 |
| 2017/0168745 A1* | 6/2017 | Burlacu-Zane | G06F 8/433 |
| 2018/0088948 A1* | 3/2018 | Rasale | G06F 15/8007 |
| 2019/0042224 A1* | 2/2019 | Caballero de Gea | G06F 8/447 |
| 2020/0073662 A1* | 3/2020 | Rasale | G06F 9/30043 |
| 2021/0034344 A1* | 2/2021 | Caballero de Gea | G06F 8/447 |
| 2022/0311841 A1* | 9/2022 | Milard | H04L 1/0041 |
| 2023/0161573 A1* | 5/2023 | Mahjour | G06F 8/4441 717/161 |

OTHER PUBLICATIONS

Welker, Anna Sophia. Determining the Perfect Vectorization Factor. Diss. Saarland University, 2021. (Year: 2021).*

Grace Period Disclosure: IBM® Open XL C/C++ Compiler, Sep. 2021, (7 pages), https://www.ibm.com/products/xl-cpp-aix-compiler-power.

Grace Period Disclosure: IBM® Open XL Fortran Compiler, Sep. 2021, (6 pages), https://www.ibm.com/products/xl-fortran-aix-compiler-power.

Transmittal Letter Regarding Confidential Activity, Dec. 13, 2021, (1 page).

IBM, "z/Architecture—Principles of Operation," IBM Publication No. SA22-7832-12, Thirteenth Edition, Sep. 2019, pp. 1-2000.

Mell, Peter and Tim Grance, "The NIST Definition of Cloud Computing," National Institute of Standards and Technology, Information Technology Laboratory, Special Publication 800-145, Sep. 2011, pp. 1-7.

Pohl, Angela et al., "Vectorization Cost Modeling for NEON, AVX and SVE," Science Direct Performance Evaluation vols. 140-141, May 13, 2020, pp. 1-16.

Nema, Ashutosh, "Epilog Loop Vectorization," Phabricator, Feb. 22, 2017, pp. 1-38.

Eichenberger, Alexandre E et al., "Vectorization for SIMD Architectures with Alignment Constraints," PLDI'04, Jun. 11, 2004, pp. 1-12.

Nuzman, Dorit et al., "Auto-Vectorization of Interleaved Data for SIMD," Nov. 11, 2005, pp. 1-10.

Krzikalla, Olaf et al., "Auto-Vectorization Techniques for Modern SIMD Architectures," 2011 (no further date information available), pp. 1-11.

LLVM Compiler Infrastructure, "Auto-Vectorization in LLVM," 2003 (no further date information available), pp. 1-9.

Phabricator, "Epilogue Vectorization with Optimal Control Flow," Oct. 2020, pp. 1-129.

Enkovich, Ilya, "Support Vectorization of Loop Epilogues," May 2016, pp. 1-5.

Pohl, Angela et al., "Portable Cost Modeling for Auto-Vectorizers," 2019 IEEE 27th International Symposium on Modeling, Analysis, and Simulation of Computer and Telecommunication Systems (MASCOTS), Oct. 2019, pp. 1-11.

Enkovich, Ilya, "Support Loop Epilogue Masking and Low Trip Count Loop Vectorization," Jun. 2016, pp. 1-8.

Kosov, Pavel et al., "LLVM PGO Instrumentation: Example of CallSite-Aware Profiling," 2020 Live Virtual Developers' Meeting, Sep. 2020, pp. 1-45.

* cited by examiner

SELECTING AN EPILOGUE VECTORIZATION FACTOR FOR USE IN COMPUTER PROCESSING

STATEMENT REGARDING PRIOR DISCLOSURES

The following disclosure(s) are submitted under 35 U.S.C. 102(b)(1)(A):

DISCLOSURE(S): IBM® Open XL C/C++ Compiler, September 2021; and IBM® Open XL Fortran Compiler, September 2021.

BACKGROUND

One or more aspects relate, in general, to processing within a computing environment, and in particular, to facilitating such processing.

Processing within a computing environment includes executing computer programs that perform various tasks. Programs are typically written in a program code, referred to as source code, which is not understood by a machine, such as a computer. However, the source code is translated to machine code, referred to as machine language, which is understandable by a computer. This translation may be performed using a compiler. There are many available compilers, and different compilers offer different features. One feature that is offered is an optimization feature in which one or more optimizations are applied to the program to enhance program performance.

One type of optimization is vectorization, in which parts of sequential programs are transformed into parallel operations. As an example, loop vectorization transforms procedural loops by assigning a processing unit to each pair of operands. As part of loop vectorization, a loop is vectorized or widened based on a vectorization factor. A result of this vectorization may be the creation of an epilogue or residual loop.

The performance of epilogue loops is taken into consideration for certain architectures including, e.g., modern single instruction, multiple data (SIMD) architectures. Further, some architectures address the growing need for faster execution of epilogue loops by introducing masked vector instructions, which the compilers can sometimes use. However, the availability, applicability and performance characteristics of these instructions vary from architecture to architecture, making their use limited.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes automatically selecting a vectorization factor to be used in vectorization of an epilogue loop in program code. The automatically selecting includes selecting the vectorization factor from a plurality of candidate vectorization factors based on one or more considerations relating to vectorizing the epilogue loop. The vectorization factor that is automatically selected is used in vectorizing the epilogue loop.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In one or more aspects, a capability is provided to facilitate processing within a computing environment. The capability includes, for instance, facilitating processing associated with computer programs having procedural loops to be vectorized, in which sequential operations of the loops are transformed into parallel operations. A by-product of vectorizing a loop (referred to herein as a main loop) may be the creation of an epilogue or residual loop (i.e., a remaining loop), which may also be vectorized. To vectorize the epilogue loop (similar to vectorization of a main loop), a vectorization factor is employed, which is used to control the vectorization. A value of the vectorization factor that is used may impact performance, either positively or negatively.

Thus, in accordance with an aspect of the present invention, a capability is provided to determine a vectorization factor to be used in vectorization of loops, such as epilogue loops. As a particular example, the capability includes selecting a vectorization factor from a plurality of vectorization factors based on one or more considerations, one or more of which include, for instance, register usage of the epilogue loop based on candidate vectorization factors, trip count of the epilogue loop, estimated code size of the epilogue loop (e.g., before or after being vectorized), and/or estimated cost of additional branches in the vectorized epilogue loop. Additional, fewer and/or other considerations may be used.

Figure 1:
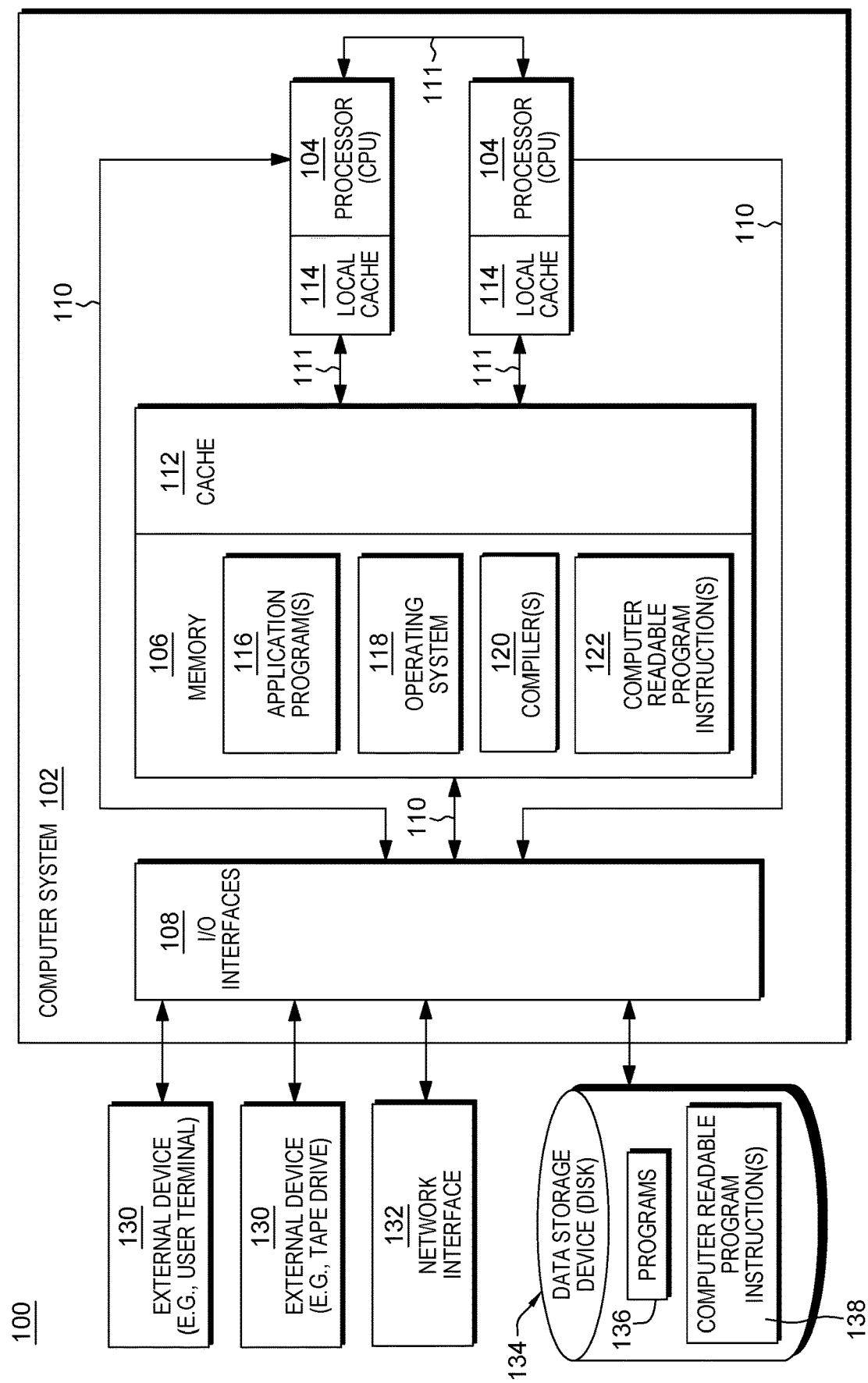
FIG. 1 depicts one example of a computing environment to include and/or use one or more aspects of the present invention.

In one aspect, the selection of the vectorization factor is automatically performed by, e.g., a processor, and in one example, by a compiler executing on a processor. One example of a computing environment executing such a processor is described with reference to FIG. 1. As an example, the computing environment of FIG. 1 is based on the IBM® Power® instruction set architecture offered by International Business Machines Corporation, Armonk, New York. However, the Power instruction set architecture is only one instruction set architecture to be used; other instruction set architectures offered by International Business Machines Corporation and/or other corporations, entities, etc. may be used. IBM and Power are registered trademarks or trademarks of International Business Machines Corporation in at least one jurisdiction.

Referring to FIG. 1, in one example, a computing environment 100 includes, for instance, a computer system 102 shown, e.g., in the form of a general-purpose computing device. Computer system 102 may include, but is not limited to, one or more processors or processing units 104 (e.g., central processing units (CPUs) and/or special-purpose processors, etc.), a memory 106 (a.k.a., system memory, main memory, main storage, central storage or storage, as examples), and one or more input/output (I/O) interfaces 108, coupled to one another via one or more buses and/or other connections. For instance, processors 104 and memory 106 are coupled to I/O interfaces 108 via one or more buses 110, and processors 104 are coupled to one another via one or more buses 111.

Bus 111 is, for instance, a memory or cache coherence bus, and bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of one or more processors 104 via, e.g., one or more buses 111. Further, memory 106 may include one or more programs or applications 116, at least one operating system 118, one or more compilers 120 and one or more computer readable program instructions 122. Computer readable program instructions 122 may be configured to carry out functions of embodiments of aspects of the invention.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one or more aspects, a compiler (e.g., compiler 120) includes optimization processing, such as processing used to determine an epilogue vectorization factor to be used in vectorizing an epilogue loop. In one example, the processing includes selecting (e.g., automatically) the epilogue vectorization factor based on one or more considerations, including, e.g., properties of the vectorized main loop that produced the epilogue loop and/or properties of the epilogue loop, as described herein.

Choosing an appropriate vectorization factor for the epilogue loop may improve performance. In general, choosing the largest possible value (i.e., the main vector loop vectorization factor) would be desirable as it improves throughput, but since the trip count (e.g., the number of iterations) of the epilogue loop is usually small, choosing a larger vectorization factor will reduce (possibly to zero) the number of iterations executed in vector form. For example, consider the following vectorizable loop:

do i=1, i<=47, 1

$A(i)=B(i)+C(i)$

Assuming that the loop is vectorized by a factor of 16:

do i=1, i<=32, 16     (1)

$A(i:i+15)=B(i:i+15)+C(i:i+15)$     (2)

do i=33, i<=47, 1     (3)

$A(i)=B(i)+C(i)$     (4)

the residual scalar loop is to iterate for a total of 15 iterations. However, if the residual loop (e.g., lines (3)-(4)) is vectorized by a factor of 16, none of the vector code in the vectorized residual loop would be executed, since the number of iterations left at the end of the main vector loop (e.g., lines (1)-(2)) is less than 16. This eliminates or at least reduces the value of epilogue vectorization and/or negatively affects performance.

Thus, based on the foregoing, it is useful to know the likely trip count of the epilogue loop. The trip count determines how many times the loop iterates during execution of the program. Assuming the trip count is not a compile-time constant, it is estimated, in accordance with one or more aspects of the present invention. For instance, in one embodiment, the estimation of the trip count (referred to herein as the likely trip count) of the epilogue loop is performed without having access to statistical information about execution of the loop. In another embodiment, the estimation of the trip count includes using, for instance, profile guided optimization (PGO) techniques and/or other statistical techniques to determine the likely trip count of the epilogue loop.

In some compilers, such as LLVM and/or other compilers, interleaving is applied as part of the vectorization transformation to increase instruction level parallelism, saturate load/store units and break up reduction dependencies. An example involving vectorization, as well as interleaving (e.g., after vectorization by 8 and interleaving by 2), is shown below:

$$do\ i=1,\ i<=32,\ 16 \qquad (1)$$

$$A(i:i+7)=B(i:i+7)+C(i:i+7) \qquad (2)$$

$$A(i+8:i+15)=B(i+8:i+15)+C(i+8:i+15) \qquad (3)$$

$$do\ i=33,\ i<=47,\ 1 \qquad (4)$$

$$A(i)=B(i)+C(i) \qquad (5)$$

In one example, the product of the vectorization factor and the interleave factor plays a role in the profitability of the epilogue loop vectorization. The larger these factors, the more likely that the program spends considerable time in the epilogue loop, so the more profitable the transformation.

In addition to the above, one or more of the following factors may also be considered as part of the profitability analysis. As an example, vectorizing epilogue loops includes copying and replicating the body of the vectorized main loop which increases code size and may impact instruction cache performance. Therefore, in one example, code size increase is a consideration. Further, epilogue loop vectorization increases the live range of each induction variable (i.e., a variable that is increased or decreased by a fixed amount on each loop iteration and may be used in future processing), thereby increasing register pressure. Therefore, register pressure (i.e., register usage) is a consideration, in one example, when estimating the cost of epilogue vectorization. Additionally, epilogue loop vectorization causes the control flow around the loop to become more complicated resulting in additional branch instructions, so extra branch cost is to be considered, in one example.

Using one or more of the above considerations or factors, a process and/or formula for selecting a vectorization factor (e.g., a profitable vectorization factor) for epilogue loops is provided, in accordance with one or more aspects of the present invention. A cost model is generated, in accordance with one or more aspects, that provides for potential performance improvements of epilogue vectorization without having to provide additional input to the compiler. A profitability analysis is performed, in one example, that is specifically tailored towards vectorization of epilogue loops. The cost-model estimates performance properties of the epilogue loop based on, for instance, characteristics of the original loop and the vectorized main loop. This allows the compiler to decide when it is profitable to apply epilogue vectorization and to select a value for the vectorization factor.

In one or more aspects, to select a vectorization factor to be used in vectorization of an epilogue loop, a maximum epilogue trip count (METC), which is a maximum number of times that the epilogue loop can possibly be iterated over in scalar form, and a likely epilogue trip count (LETC), which is an estimate of the most common trip count for the epilogue loop, are used. The maximum epilogue trip count and the likely epilogue trip count are computed using one of the following techniques, as examples:

Calculate a lower and an upper bound on the trip count of the epilogue loop. The lower bound is, e.g., zero, since that is the minimum number of times that the epilogue loop can execute. The upper bound is given by a formula, such as, for instance: METC=VF*IF−1, where VF is the vectorization factor for the main vector loop and IF is the interleave factor (if applicable) of the main vector loop. The average of these bounds is used, in one example, to estimate the likely epilogue trip count (e.g., LETC=(VF*IF−1)/2).

In cases where the loop trip count information is available to the compiler (e.g., via profile guided optimization (PGO) and/or other statistical information), that information is used directly as the likely epilogue trip count value. When profile guided optimization information and/or other statistical information is available, the maximum epilogue trip count is replaced with the likely epilogue trip count in each instance that the maximum epilogue trip count is referenced in the process.

A formula, as an example, is then used to estimate the overhead cost (OC) associated with epilogue vectorization. In one example, the profitability of epilogue vectorization is directly proportional to the epilogue trip count and the vectorization factor chosen for the epilogue loop, while it is inversely proportional to the code size increase which would make the transformation less profitable. An example of this formula is further described below.

Figure 2:
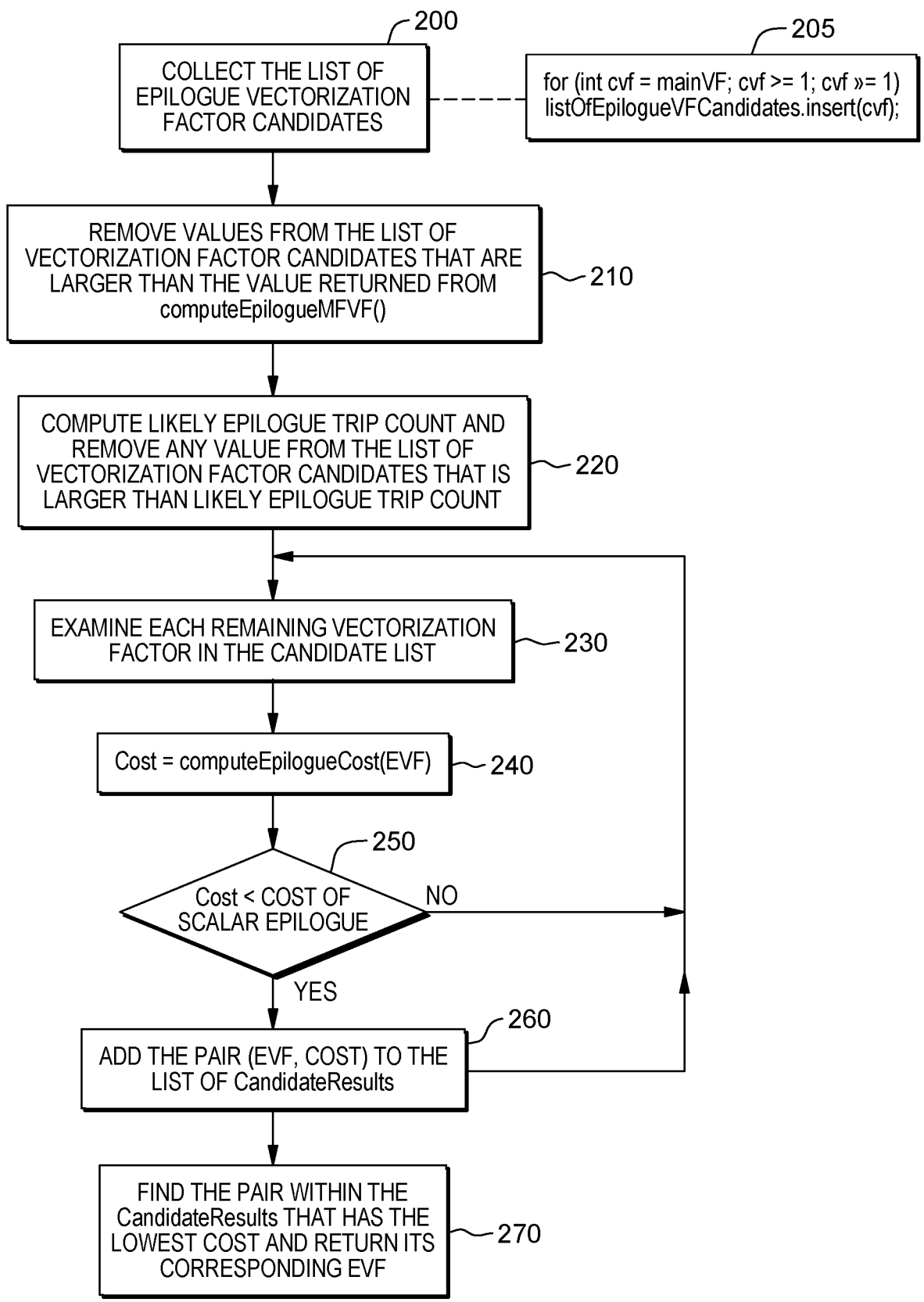
FIG. 2 depicts one example of selecting an epilogue vectorization factor, in accordance with one or more aspects of the present invention.
Figure 3:
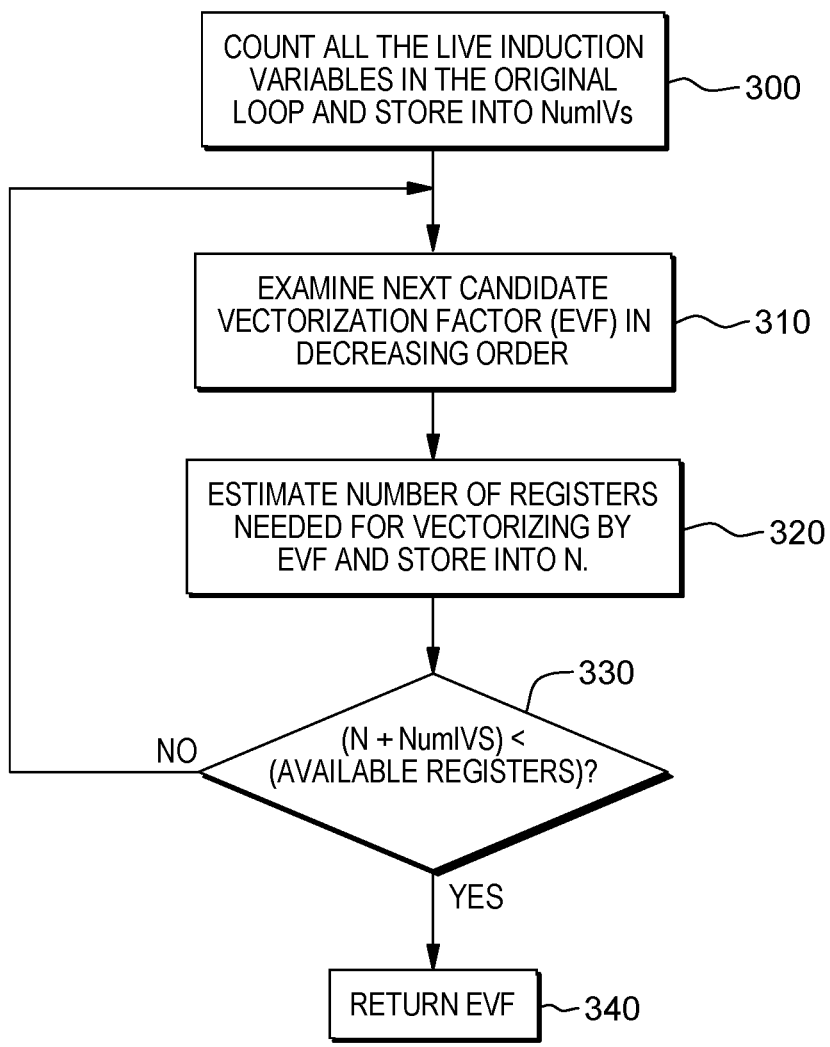
FIG. 3 depicts one example of determining a maximum feasible vectorization factor, in accordance with one or more aspects of the present invention.
Figure 4:
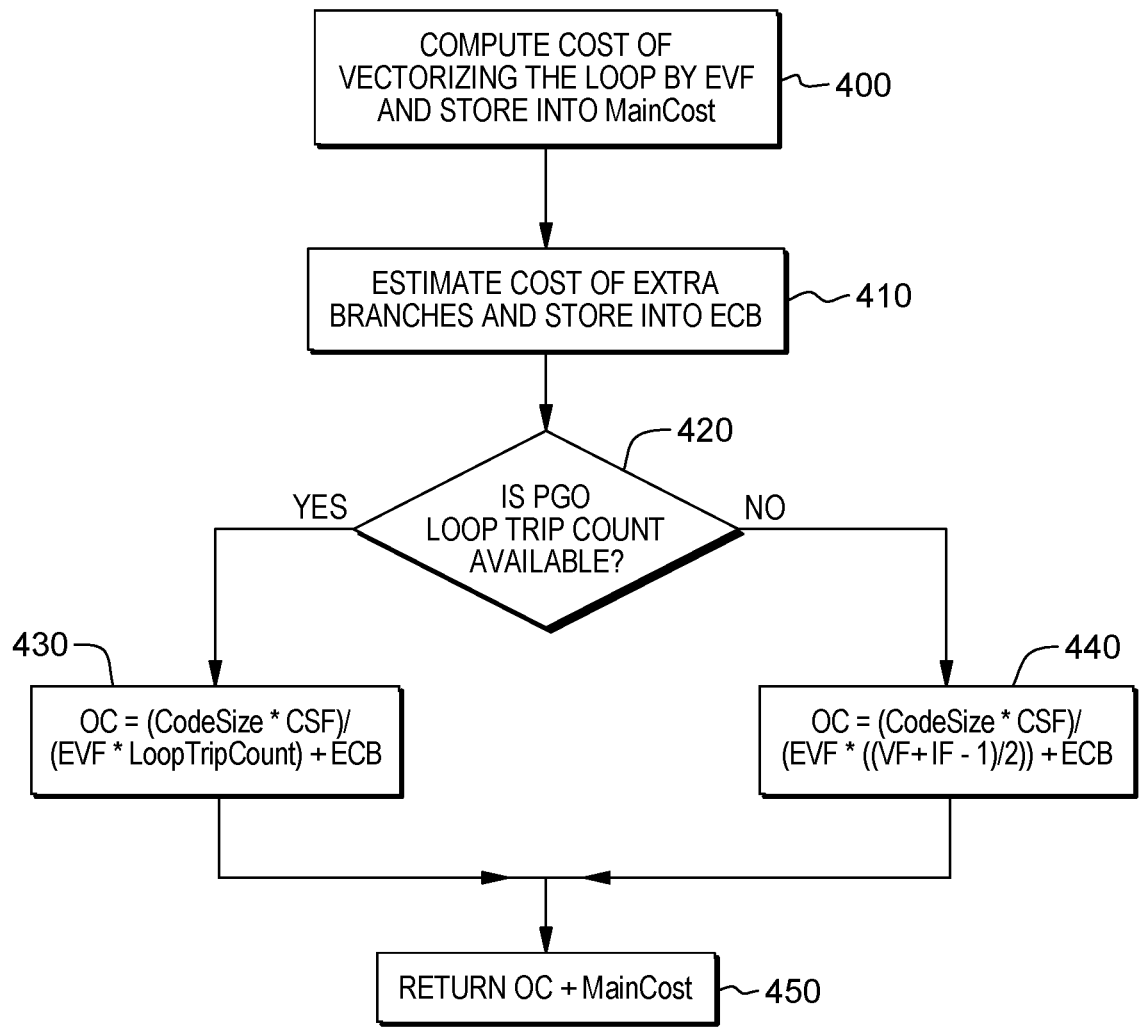
FIG. 4 depicts one example of estimating costs associated with vectorizing an epilogue loop by a given factor, in accordance with one or more aspects of the present invention.

One example of processing to select a vectorization factor to be used in epilogue loop vectorization, in accordance with one or more aspects of the present invention, is described with reference to FIGS. 2-4. FIG. 2 depicts one example of selecting a vectorization factor, which includes, for instance, determining a maximum feasible vectorization factor (MFVF), an example of which is described with reference to FIG. 3, and determining costs associated with epilogue vectorization, an example of which is described with reference to FIG. 4. The processing described with reference to FIGS. 2-4 is performed by a processor (e.g., processor 104) or other processing circuit. In one example, the processing is executed by a compiler (e.g., compiler 120) executing on a processor (e.g., processor 104). The compiler may be many different compilers. For instance, it may be an LLVM compiler, a compiler based on an LLVM compiler, or other compilers.

In one embodiment, referring to FIG. 2, the process starts by enumerating candidate vectorization factors starting, e.g., from a vectorization factor of the vector loop from which the epilogue loop was generated (referred to as the main loop) and decreasing from that vectorization factor by a defined value (e.g., power-of-two) until a select value, such as 1, is reached 200, 205. For example, if the main loop was vectorized with a vectorization factor of 16, then a vectorization factor candidate list starts as, e.g., a sorted list including values 16, 8, 4, 2, 1. Many other examples are possible.

Register pressure (i.e., register usage) for each vectorization factor is then examined to determine whether the upper bound of the vectorization factor candidate list can be clamped 210. For instance, a maximum feasible vectorization factor (MFVF) for the epilogue loop is determined by estimating the number of registers required for each vectorization factor (or select vectorization factors) using a process, referred to as computeEpilogueMFVF, an example of which is described below with reference to FIG. 3. A vectorization factor is considered infeasible, if the total estimated register usage exceeds the available registers on the target machine. Since, in one example, epilogue vectorization increases the live range of induction variables, in one or more aspects of the present invention, the estimated register usage is increased by the number of induction variables. If the maximum feasible vectorization factor is smaller than the first element of the sorted list, then values from the beginning of the sorted list are removed, until the maximum feasible vectorization factor is no longer smaller than the first element or the list is empty.

Moreover, as indicated herein, choosing a vectorization factor that is larger than the trip count of the epilogue loop results in the vectorized instructions being skipped at execution time, thereby nullifying the benefits of epilogue vectorization. As such, in one embodiment, an operation is added to the process to further prune the list of candidate vectorization factors by removing any value that is, e.g., larger than the likely epilogue trip count (LETC) 220.

The process iterates over the remaining vectorization factors in the candidate list 230 and computes the cost of the loop when vectorized by the given vectorization factor 240, using a process, referred to herein as computeEpilogueCost, an example of which is described with reference to FIG. 4. In one example, this process adds the overhead cost (OC) of the epilogue vectorization, using a selected formula provided herein, to the cost of vectorizing the loop. If the total cost is not smaller than the cost of the scalar loop 250, processing continues to 230; otherwise, if the total cost is smaller than the cost of the scalar loop, the pair of vectorization factor and cost information is recorded in a select location (e.g., a side table) 260. Based on the vectorization factors being examined, the process selects, for instance, the vectorization factor-cost pair that has the lowest cost and returns that as the final result 270.

As indicated above, in one example, the selecting a desired epilogue vectorization factor (e.g., one that is likely profitable) includes determining an epilogue maximum feasible vectorization factor, one embodiment of which is described with reference to FIG. 3. In one example, live induction variables in the original loop are counted and stored in a variable, referred to as NumIVs, 300. Further, a next candidate epilogue vectorization factor (EVF) in, e.g., decreasing order, is examined 310. For instance, for a given vectorization factor, the number of registers to be used for vectorizing the epilogue loop by the given candidate vectorization factor is estimated and stored in a variable, N, 320. A determination is made as to whether (N+NumIVs) is less than available registers 330. If (N+NumIVs) is not less than available registers, then processing continues with 310 for a next epilogue vectorization factor; otherwise, the given candidate vectorization factor is returned and used as the maximum feasible vectorization factor 340.

Further, returning to FIG. 2, in one example, selecting a desired epilogue vectorization factor includes determining the cost of the loop when vectorized by the given vectorization factor 240. An example of this processing is described with reference to FIG. 4. In one example, the cost of vectorizing the loop by each remaining candidate vectorization factor is determined and stored in a location, referred to, e.g., as MainCost 400. For instance, in LLVM, this is the process used to determine profitability of vectorizing the main loop (without considering the possibility of vectorizing its epilogue). This includes, for instance, going through each instruction in the body of the loop and estimating, via processor-dependent query functions, the cost of vectorizing each of the instructions using a given vectorization factor. The summation of the individual instruction costs results in the total cost of vectorizing the loop. This cost is typically compared against the cost of running the loop in scalar form, which is computed in a similar fashion.

Further, the cost of extra branches is estimated and stored, e.g., in a location, referred to as, e.g., ECB 410. Further, an overhead cost is determined. The determining of the overhead cost is based, for instance, on the profitability of epilogue vectorization being directly proportional to the epilogue trip count and the vectorization factor chosen for the epilogue loop, while it is inversely proportional to the code size increase which would make the transformation less profitable.

In one example, a determination is made as to whether a profile guided optimization (PGO) loop trip count or other statistically provided trip count is available 420. If it is available, an overhead cost (OC) associated with epilogue vectorization is determined using, for instance: overhead cost is set equal to (CodeSize*CSF)/(EVF*LoopTripCount)+ECB 430, where CodeSize is an estimate of the number of machine instructions to be used by the epilogue loop body (or the original or main loop body); CSF is a scaling factor for tuning the sensitivity to code size increase; EVF is the epilogue vectorization factor being evaluated; and ECB is an estimated cost of extra branches to be used to implement epilogue vectorization.

However, if a profile guided optimization loop trip count or other statistically provided trip count is not available, the overhead cost is set equal to (CodeSize*CSF)/(EVF*((VF+IF−1)/2))+ECB 440, wherein VF is the vectorization factor of the main loop; IF is the interleave factor, if applicable; and (VF+IF−1)/2 is an estimated trip count of the epilogue loop. A summation of the overhead cost and the MainCost is returned 450. This processing is repeated for each remaining epilogue vectorization factor.

As described herein, in one or more aspects, a vectorization factor is selected (e.g., automatically by, e.g., a compiler) based on one or more considerations. The compiler may automatically choose a vectorization factor for each loop (e.g., each epilogue loop), independently from other loops, making it suitable for automatic compiler optimization. The considerations may include, for instance, one or more of a vectorization factor of the main loop, loop trip count, register usage, additional branching and/or overhead costs, to name just a few example considerations.

Another consideration may be the possibility of register spills. Register spills are considered detrimental to the performance of the transformation as they increase load/store unit traffic for memory bound loop nests. Thus, it is assumed that introducing additional register spills, beyond what is tolerated for vectorization of the main loop, would render epilogue vectorization unprofitable. Additional, fewer and/or other factors may be considered.

In one example, the cost of epilogue vectorization for a set of possible vectorization factors is estimated, and the estimation is compared against the estimated cost of running the epilogue loop sequentially, as would be the case without epilogue vectorization. The cost is calculated based on certain considerations (also referred to as factors or constraints) that may be derived from the original loop (e.g., unvectorized), as well as properties of the vectorized main loop, as examples.

In one or more aspects, a cost model for determining profitability of epilogue vectorization is defined and a vectorization factor that is likely to provide the best performance considering various factors, such as, e.g., loop trip count, code size, register pressure, interleaving, and/or cost of extra branches, is selected. The cost model is able to consider vectorization factors of various values, including ones that are as large as the vectorization factor chosen for the main loop.

A process and/or formula are defined, based on one or more of the considerations, to select (or compute) a vectorization factor that is, e.g., profitable for epilogue loops. A cost model is defined that allows programmers to benefit from potential performance improvement of epilogue vectorization without having to provide additional input to the compiler. This is in contrast with existing solutions in which the user and/or the compiler rely solely on empirically driven hints and heuristics to decide when to apply the transformation. For example, in at least one version of LLVM, the user can pick a specific global epilogue vectorization factor for all the loops in the entire application. This could result in poor performance when applied to loops that have different performance characteristics than the loop(s) based on which the specific value is derived. Alternatively, users of at least one version of LLVM can specify a predetermined minimum vectorization factor for the main loop to decide whether to apply the transformation. This could result in poor performance, as well, because wider vector loops would unnecessarily get excluded while narrower ones would unreasonably get transformed. These shortcomings stem from the fact that user interventions are solely based on empirically driven heuristics and may vary not only from workload to workload, but also from one loop to another within the same application. This may make the existing solutions unsuitable for automatic compiler optimization purposes.

One or more aspects of the present invention are inextricably tied to computer technology and facilitate processing within a computer, improving performance thereof. The use of a process to automatically select a vectorization factor to be used in vectorizing a loop, such as an epilogue loop, facilitates processing and may increase performance within a computing environment. Providing parallelism in computing often improves performance. The selecting of a vectorization factor that is profitable and using that vectorization factor in vectorization provides certain optimizations within the computing environment, improving performance therein.

Although embodiments are described herein, other variations and/or embodiments are possible.

Figure 5A:
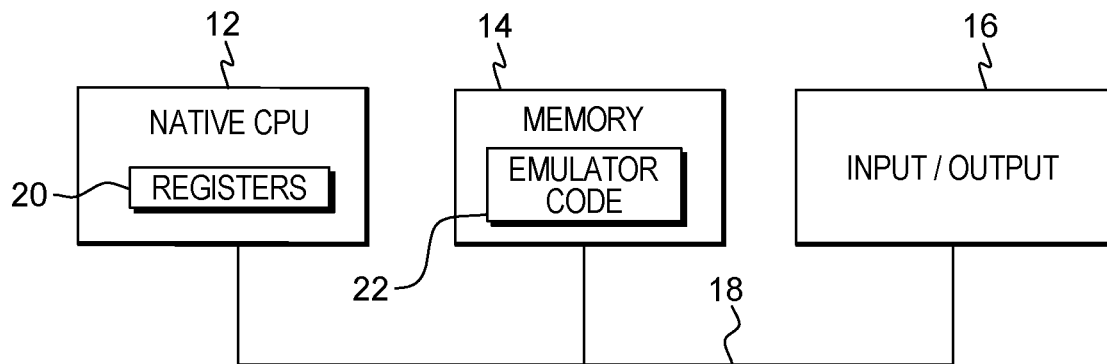
FIG. 5A depicts another example of a computing environment to incorporate and/or use one or more aspects of the present invention.

Another example of a computing environment to incorporate and use one or more aspects of the present invention is described with reference to FIG. 5A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include an IBM® Power® processor offered by International Business Machines Corporation, Armonk, New York; an HP Superdome with Intel® processors offered by Hewlett Packard Co., Palo Alto, California; and/or other machines based on architectures offered by International Business Machines Corporation, Hewlett Packard, Intel Corporation, Oracle, or others. Intel is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, e.g., the IBM® z/Architecture® instruction set architecture, such as Power processors, HP Superdome servers or others, to emulate the z/Architecture instruction set architecture and to execute software and instructions developed based on the z/Architecture instruction set architecture. z/Architecture is a trademark or registered trademark of International Business Machines Corporation in at least one jurisdiction.

Figure 5B:
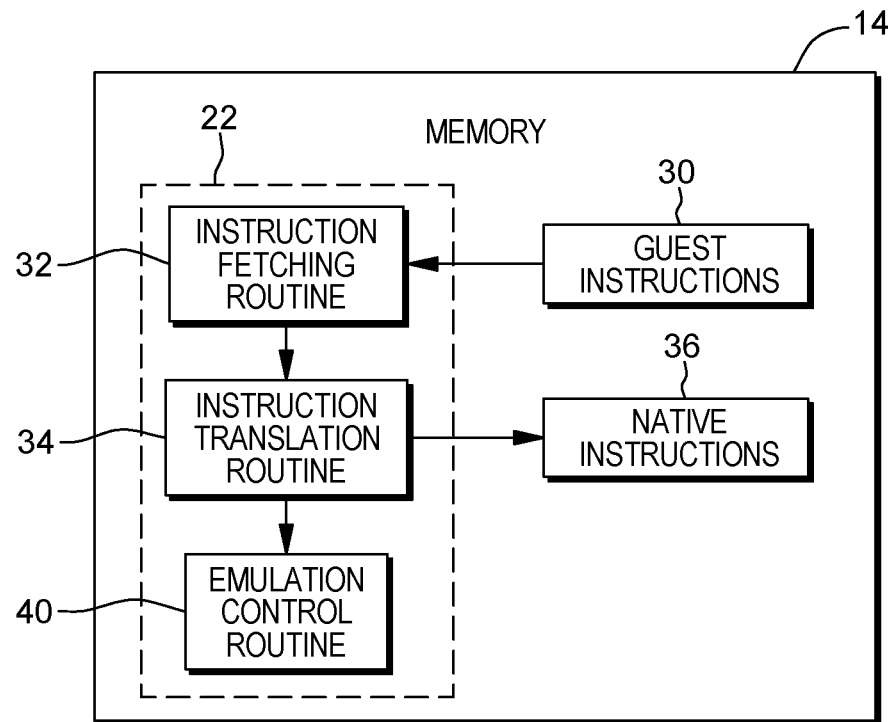
FIG. 5B depicts further details of the memory of FIG. 5A, in accordance with one or more aspects of the present invention.

Further details relating to emulator code 22 are described with reference to FIG. 5B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture instruction set architecture, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to select (e.g., automatically) a vectorization factor for vectorizing a loop, such as an epilogue loop, and/or to perform one or more other aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
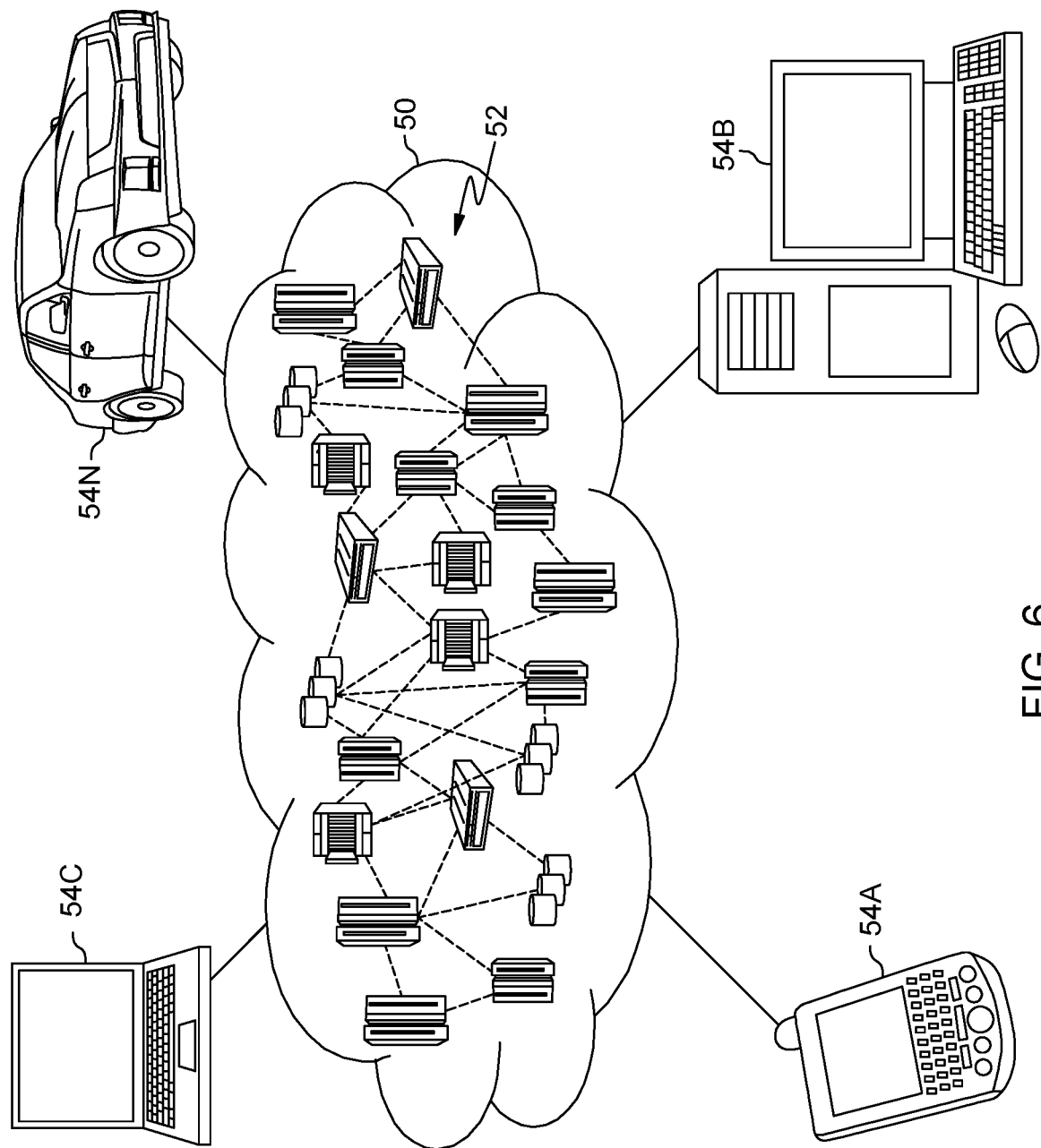
FIG. 6 depicts one embodiment of a cloud computing environment, in accordance with one or more aspects of the present invention.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
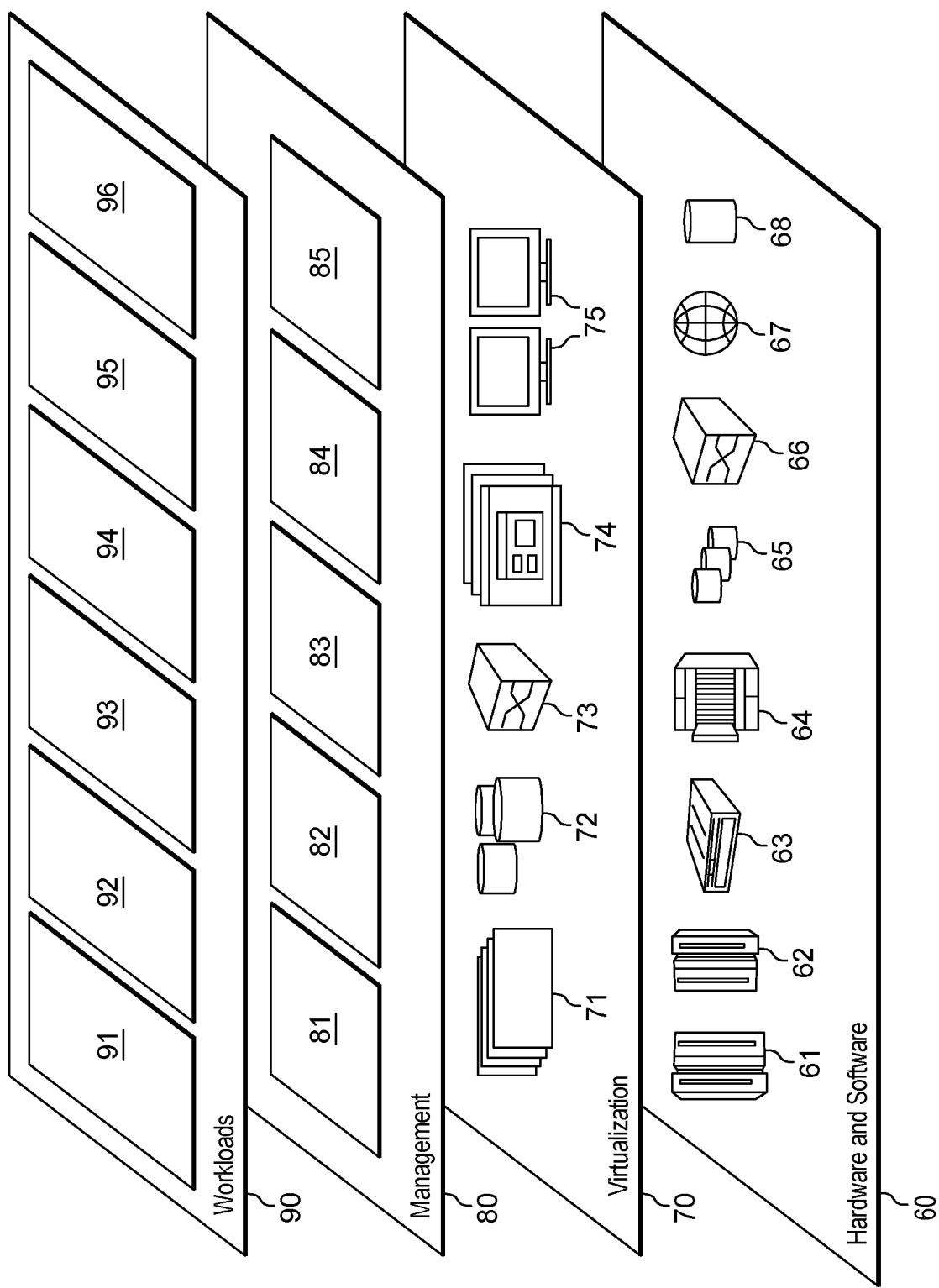
FIG. 7 depicts one example of abstraction model layers, in accordance with one or more aspects of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vectorization factor selection processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of operations and/or techniques be employed. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed.

Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
one or more computer readable storage media and program instructions collectively stored on the one or more computer readable storage media to perform a method comprising:
determining a likely epilogue trip count for an epilogue loop in program code, the determining the likely epilogue trip count including using an equation that is based on a maximum epilogue trip count for the epilogue loop;
automatically selecting a vectorization factor to be used in vectorization of the epilogue loop in the program code, wherein the automatically selecting includes selecting the vectorization factor from a plurality of candidate vectorization factors based on one or more considerations relating to vectorizing the epilogue loop, wherein selection of the plurality of candidate vectorization factors uses the likely epilogue trip count; and
using the vectorization factor that is automatically selected in vectorizing the epilogue loop.

2. The computer program product of claim 1, wherein the one or more considerations include register usage associated with the plurality of candidate vectorization factors.

3. The computer program product of claim 1, wherein the one or more considerations include a trip count of the epilogue loop.

4. The computer program product of claim 1, wherein the one or more considerations include code size of a loop that produces the epilogue loop.

5. The computer program product of claim 1, wherein the automatically selecting comprises:
eliminating from the plurality of candidate vectorization factors, based on at least one consideration of the one or more considerations, at least one candidate vectorization factor to provide a revised set of candidate vectorization factors;
determining one or more overhead costs for one or more candidate vectorization factors of the revised set of candidate vectorization factors; and
selecting, based on the one or more overhead costs, the vectorization factor from the one or more candidate vectorization factors of the revised set of candidate vectorization factors.

6. The computer program product of claim 5, wherein the determining an overhead cost of the one or more overhead costs is based on an estimated code size of the epilogue loop, an estimated trip count of the epilogue loop and an estimated cost of additional code branches to implement vectorization of the epilogue loop.

7. The computer program product of claim 5, wherein the method further comprises:
determining, for each candidate vectorization factor of at least multiple candidate vectorization factors of the plurality of candidate vectorization factors, a number of registers to be used by the epilogue loop for each respective candidate vectorization factor; and
wherein the eliminating comprises removing from the plurality of candidate vectorization factors one or more candidate vectorization factors based on the number of registers to be used by the epilogue loop for the one or more candidate vectorization factors.

8. The computer program product of claim 5, wherein the eliminating comprises removing one or more candidate vectorization factors that have a defined relationship with respect to a selected trip count for the epilogue loop.

9. The computer program product of claim 8, wherein the likely epilogue trip count is the selected trip count.

10. The computer program product of claim 9, wherein the method further comprises determining the maximum epilogue trip count, the determining the maximum epilogue trip count comprises using a formula, the formula comprising a main loop vectorization factor used in vectorizing a main loop that produces the epilogue loop multiplied by an interleave factor of the main loop minus a defined value.

11. The computer program product of claim 1, wherein the automatically selecting is independent of other loops in the program code.

12. A computer system for facilitating processing within a computing environment, the computer system comprising:
a memory; and
at least one processor in communication with the memory, wherein the computer system is configured to perform a method, said method comprising:
determining a likely epilogue trip count for an epilogue loop in program code, the determining the likely epilogue trip count including using an equation that is based on a maximum epilogue trip count for the epilogue loop;
automatically selecting a vectorization factor to be used in vectorization of the epilogue loop in the program code, wherein the automatically selecting includes selecting the vectorization factor from a plurality of candidate vectorization factors based on one or more considerations relating to vectorizing the epilogue loop, wherein selection of the plurality of candidate vectorization factors uses the likely epilogue trip count; and
using the vectorization factor that is automatically selected in vectorizing the epilogue loop.

13. The computer system of claim 12, wherein the automatically selecting comprises:
eliminating from the plurality of candidate vectorization factors, based on at least one consideration of the one or more considerations, at least one candidate vectorization factor to provide a revised set of candidate vectorization factors;
determining one or more overhead costs for one or more candidate vectorization factors of the revised set of candidate vectorization factors; and
selecting, based on the one or more overhead costs, the vectorization factor from the one or more candidate vectorization factors of the revised set of candidate vectorization factors.

14. The computer system of claim 13, wherein the method further comprises:
determining, for each candidate vectorization factor of at least multiple candidate vectorization factors of the plurality of candidate vectorization factors, a number of registers to be used by the epilogue loop for each respective candidate vectorization factor; and
wherein the eliminating comprises removing from the plurality of candidate vectorization factors one or more candidate vectorization factors based on the number of registers to be used by the epilogue loop for the one or more candidate vectorization factors.

15. The computer system of claim 13, wherein the eliminating comprises removing one or more candidate vectorization factors that have a defined relationship with respect to a selected trip count for the epilogue loop, wherein the likely epilogue trip count is the selected trip count.

16. A computer-implemented method of facilitating processing within a computing environment, the computer-implemented method comprising:
    determining a likely epilogue trip count for an epilogue loop in program code, the determining the likely epilogue trip count including using an equation that is based on a maximum epilogue trip count for the epilogue loop;
    automatically selecting a vectorization factor to be used in vectorization of the epilogue loop in the program code, wherein the automatically selecting includes selecting the vectorization factor from a plurality of candidate vectorization factors based on one or more considerations relating to vectorizing the epilogue loop, wherein selection of the plurality of candidate vectorization factors uses the likely epilogue trip count; and
    using the vectorization factor that is automatically selected in vectorizing the epilogue loop.

17. The computer-implemented method of claim 16, wherein the automatically selecting comprises:
    eliminating from the plurality of candidate vectorization factors, based on at least one consideration of the one or more considerations, at least one candidate vectorization factor to provide a revised set of candidate vectorization factors;
    determining one or more overhead costs for one or more candidate vectorization factors of the revised set of candidate vectorization factors; and
    selecting, based on the one or more overhead costs, the vectorization factor from the one or more candidate vectorization factors of the revised set of candidate vectorization factors.

18. The computer-implemented method of claim 17, further comprising:
    determining, for each candidate vectorization factor of at least multiple candidate vectorization factors of the plurality of candidate vectorization factors, a number of registers to be used by the epilogue loop for each respective candidate vectorization factor; and
    wherein the eliminating comprises removing from the plurality of candidate vectorization factors one or more candidate vectorization factors based on the number of registers to be used by the epilogue loop for the one or more candidate vectorization factors.

19. The computer-implemented method of claim 17, wherein the eliminating comprises removing one or more candidate vectorization factors that have a defined relationship with respect to a selected trip count for the epilogue loop.

20. The computer program product of claim 1, wherein the automatically selecting includes removing from the plurality of candidate vectorization factors one or more candidate vectorization factors that have a defined relationship with respect to the likely epilogue trip count.

* * * * *